(12) United States Patent
Bellwood et al.

(10) Patent No.: US 8,332,536 B2
(45) Date of Patent: Dec. 11, 2012

(54) CONTENT PROTECTION CONTINUITY THROUGH AUTHORIZED CHAINS OF COMPONENTS

(75) Inventors: Thomas A. Bellwood, Austin, TX (US); Robert B. Chumbley, Round Rock, TX (US); Jacob D. Eisinger, Austin, TX (US); Travis M. Grigsby, Austin, TX (US); Matthew F. Rutkowski, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 615 days.

(21) Appl. No.: 12/482,933

(22) Filed: Jun. 11, 2009

(65) Prior Publication Data

US 2010/0318677 A1 Dec. 16, 2010

(51) Int. Cl.
*G06F 15/173* (2006.01)

(52) U.S. Cl. ........ 709/238; 709/227; 709/228; 709/229; 713/150; 713/168; 725/25; 725/26; 725/27; 725/28; 725/29; 725/30; 725/31; 380/277

(58) Field of Classification Search .......... 709/227–229; 713/150, 168; 725/25–31
See application file for complete search history.

(56) References Cited

U.S. PATENT DOCUMENTS

| | | | |
|---|---|---|---|
| 7,016,498 B2 * | 3/2006 | Peinado et al. | 380/277 |
| 7,231,669 B2 * | 6/2007 | Leung et al. | 726/26 |
| 7,296,154 B2 | 11/2007 | Evans et al. | |
| 7,353,209 B1 * | 4/2008 | Peinado et al. | 705/59 |
| 7,363,467 B2 * | 4/2008 | Vajapeyam et al. | 712/216 |
| 7,412,061 B2 * | 8/2008 | Peinado et al. | 380/277 |
| 7,496,540 B2 * | 2/2009 | Irwin et al. | 705/59 |
| 7,698,223 B2 * | 4/2010 | Padawer et al. | 705/51 |
| 2005/0066353 A1 * | 3/2005 | Fransdonk | 725/29 |
| 2005/0228995 A1 * | 10/2005 | Kwak et al. | 713/168 |

(Continued)

FOREIGN PATENT DOCUMENTS

EP 1843585 A1 10/2007

(Continued)

OTHER PUBLICATIONS

Sandhu et al.; "Secure Information Sharing Enabled by Trusted Computing and PEI Models," ASIACCS '06 Mar. 21-24, 2006, Taipei, Taiwan.

(Continued)

*Primary Examiner* — Backhean Tiv
(74) *Attorney, Agent, or Firm* — John D. Flynn; Gregory K Goshorn; Greg Goshorn, P.C.

(57) ABSTRACT

Provided is a method for the distribution and control of digital content such that Quality of Experience (QoE) is maintained. Content is protected from when the content is encrypted to when it is used. To ensure the QoE of particular content, a content owner embeds a list of required or preferred components that must be employed to render the content. The content owner's list of required or preferred components specifies specific components "trusted" to correctly process the content. The specified chain of preferred components is compared to possible devices in the system that processes the content. If there are multiple acceptable devices for a specific link, a preference system is employed to determine the device that executed the particular part of the chain. The preference system is based upon a number of factors, such as, but not limited to, performance characteristics, user preferences, expected stability, power requirements and system preferences.

17 Claims, 6 Drawing Sheets

U.S. PATENT DOCUMENTS

| | | | |
|---|---|---|---|
| 2007/0038630 A1* | 2/2007 | Li et al. | 707/9 |
| 2007/0100701 A1* | 5/2007 | Boccon-Gibod et al. | 705/21 |
| 2007/0172041 A1* | 7/2007 | Boccon-Gibod et al. | 379/142.1 |
| 2007/0185815 A1* | 8/2007 | Boccon-Gibod et al. | 705/51 |
| 2007/0271184 A1* | 11/2007 | Niebert et al. | 705/51 |
| 2008/0049935 A1 | 2/2008 | Kocher | |
| 2008/0097923 A1* | 4/2008 | Kim et al. | 705/59 |
| 2008/0184027 A1* | 7/2008 | Kumar et al. | 713/150 |
| 2008/0320543 A1 | 12/2008 | Wang | |
| 2009/0007240 A1* | 1/2009 | Vantalon et al. | 726/4 |
| 2009/0054092 A1* | 2/2009 | Stonefield et al. | 455/466 |
| 2009/0138403 A1* | 5/2009 | Lee et al. | 705/59 |
| 2010/0067705 A1* | 3/2010 | Boccon-Gibod et al. | 380/285 |
| 2010/0318677 A1* | 12/2010 | Bellwood et al. | 709/238 |

FOREIGN PATENT DOCUMENTS

| | | |
|---|---|---|
| JP | 2005348091 A | 12/2005 |

OTHER PUBLICATIONS

Reid et al.; "DRM, Trusted Computing and Operating System Architecture;" Australian Information Security Workshop 2005 (AISW2005); Conferences in Research and Practice in Information Technology, vol. 44; 2005.

"High-bandwidth Digital Content Protection System," Revision 1.3, Dec. 21, 2006, pp. 1-90, Sections 1.3, 2 Digital Content Protection LLC.

International Searching Authority; PCT International Search Report and Written Opinion; Dec. 1, 2010.

\* cited by examiner

CONTENT PROTECTION CONTINUITY THROUGH AUTHORIZED CHAINS OF COMPONENTS

TECHNICAL FIELD

The claimed subject matter relates generally to control of digital content and, more specifically, to a method and system for ensuring quality of experience (QoE) related to digital content via trusted components as determined by a content or service provider.

BACKGROUND

Description of the Related Art

As computers have become increasingly connected via networks and the Internet, the amount of content has grown in proportion to the size of the communication channels, or the bandwidth. Once used primarily for electronic mail, or email, and small file transfers, networks such as networks in general and the Internet specifically are increasingly relied upon by content providers to distribute high quality content such as movies and music recordings.

Content providers that distribute such high quality content face correspondingly increased production costs. To control security and restrict access to material, content is sometimes protected by encryption, digital rights management (DRM) systems or conditional access (CA) systems. These techniques act as "gates" to the information. However, once material is inside the gate, i.e. the receiving system has been granted control, the presentation of the content or material is unprotected and users have virtually free reign. In other words, the material may be handled or presented by any component within the receiving system, i.e. no further control is considered. One example of this approach is Blu-Ray®, a system published by the Blu-ray Disk Association (BDA). The BDA standard includes a content protection system that grants permission at a device/hardware/system level and not to individual software components that handle the content once authorization of device/hardware/system has been granted. Specifically, a particular device, identified by a licensed device identifier, is approved or prohibited from rendering content that is protected using a set of licensed device keys. The content is protected with a simple key that can be derived from components included with the content by any authorized (non-revoked) device using the simple key. Once an authorized device has unlocked the content with the key, the device and the system components have complete access to the content without further restriction, i.e. no further authorization or authentication is required. This means that in the BDA system, QoE, or trust in system components is never considered once a Blue-Ray® player has been authorized to decrypt and render the content. For example, the content may be played from any storage device, using any decoder, any video driver and even outputted or routed to another device for playback. In addition, authorization cannot be granted or denied based upon whether or not a component or chain of components meet criteria that specify, for example, particular brands, models, performance characteristics or quality.

SUMMARY OF THE CLAIMED SUBJECT MATTER

As the Inventors have herein recognized, several issues naturally arise in the environment of digital distribution of high quality content. Firstly, content providers currently have no means to control the equipment ultimately used to render the content and, thus, have no means to guarantee the Quality of Experience (QoE). A poorly rendered product may not meet the minimum expectations of either the provider or the user and a "bad" content experience may create a bad impression for the end user of the content, provider or both.

Secondly, there is no way for a content provider to protect the content from unauthorized uses by the receiving system, typically an operating system (OS). Currently, a user may process, and possibly decrypt, transmitted material in an unrestricted manner. Further, a user is typically able to employ software drivers, components, codecs and applications that may not be trusted by the content provider. In other words, a content provider must implicitly "trust" the user's entire platform even though individual components of the platform are not trusted because the components enable unauthorized actions on the material or fail to meet the provider's minimum quality requirements Finally, there is not way for a provider of content, either streamed or packaged, to verify the receiving system's QoE or component-level trust security even though there is a lot of overhead that takes place on both the senders' and the receivers' system to ensure some QoE and compatibility issues. For example, systems must prepare streams, provision bandwidth, allocate memory, load software and so on.

Provided is a method for the distribution and control of digital content such that component level trust and Quality of Experience (QoE) is maintained. Content is protected from when the content is encrypted to when it is used throughout chains of components by the presentation system of the receiving component. To ensure the trust and QoE of particular content, a content owner, or producer, embeds within or transmits in conjunction with the content a list of required or preferred components that must be employed to render the content. In the alternative, the list of required or preferred components could be provided by a party other than the content owner and associated with the content. An operating system (OS) may have several available disc readers, network drivers, encoders/decoders, presentation applications and content writers, or "burners;" and so on, each able to process particular content. In addition, different versions of each of these components may be available. In the event multiple components with similar functionality are available, the disclosed techniques enable the content owner to specify which is utilized. The content owner's list of required or preferred components specifies specific components "trusted" to correctly process the content. For example, a media file, such as a MPEG4 file, may include information that specifies specific types of DVD readers, decoders, secure buses, secure video drivers, player applications and display monitors. The content owner can specify a Samsung model 1042 or 2052 DVD player, a Sony MPRG4 v2 decoder, an IBM 782a Bus and so on. In addition, the content owner is able to prevent playing of content on systems that do not meet minimum requirements. In the alternative, systems that fail to meet requirements may still be able to play protected material but a quality warning is displayed prior to playback, perhaps accompanied by a human-readable list of approved components. Another alternative is to allow the video to be played at a reduced quality level, perhaps accompanied by another warning.

The specified chain of trusted or preferred components, as enumerated in a list, or Execution Chain Descriptor (ECD), embedded in the content, is compared to possible devices in the system that process the content. If there are multiple acceptable devices for a specific link, a preference system is employed to determine the device that executes the particular part of the chain. The preference system is based upon a number of well known factors, such as, but not limited to, performance characteristics, content or service provider preferences, expected stability, power requirements, system preferences and so on. In addition, configuration parameters may be considered. For example, in the case of a television or monitor, configuration parameters may include, but are not limited to, drive speed, display resolution and refresh rate. The use of ECDs enables content to be controlled while the content is transmitted and rendered. In addition, ECDs embedded in the content may be changed at any time, including mid stream by an authorized service, e.g. as indicated by the content provider, service provider or licensing service such as BDA.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE FIGURES

A better understanding of the claimed subject matter can be obtained when the following detailed description of the disclosed embodiments is considered in conjunction with the following figures, in which:

DETAILED DESCRIPTION OF THE FIGURES

Although described with particular reference to a digital content delivery system, the claimed subject matter can be implemented in any information technology (IT) system in which Quality of Experience (QoE) or component-level trust control is desirable. Those with skill in the computing arts will recognize that the disclosed embodiments have relevance to a wide variety of content delivery and computing environments in addition to those described below. In addition, the methods of the disclosed technology can be implemented in software, hardware, or a combination of software and hardware. The hardware portion can be implemented using specialized logic; the software portion can be stored in a memory and executed by a suitable instruction execution system such as a microprocessor, personal computer (PC) or media playback device.

In the context of this document, a "memory" or "recording medium" can be any means that contains, stores, communicates, propagates, or transports the program and/or data for use by or in conjunction with an instruction execution system, apparatus or device. Memory and recording medium can be, but are not limited to, an electronic, magnetic, optical, electromagnetic or semiconductor system, apparatus or device. Memory and recording medium also includes, but is not limited to, for example the following: a portable computer diskette, a random access memory (RAM), a read-only memory (ROM), an erasable programmable read-only memory (EPROM or flash memory), and a portable compact disk read-only memory or another suitable medium upon which a program and/or data may be stored.

One embodiment, in accordance with the claimed subject, is directed to a programmed method for content delivery control. The term "programmed method", as used herein, is defined to mean one or more process steps that are presently performed; or, alternatively, one or more process steps enabled to be performed at a future point in time. The term "programmed method" anticipates three alternative forms. First, a programmed method comprises presently performed process steps. Second, a programmed method comprises a computer-readable medium embodying computer instructions, which when executed by a computer performs one or more process steps. Finally, a programmed method comprises a computer system that has been programmed by software, hardware, firmware, or any combination thereof, to perform one or more process steps. It is to be understood that the term "programmed method" is not to be construed as simultaneously having more than one alternative form, but rather is to be construed in the truest sense of an alternative form wherein, at any given point in time, only one of the plurality of alternative forms is present.

Figure 1:
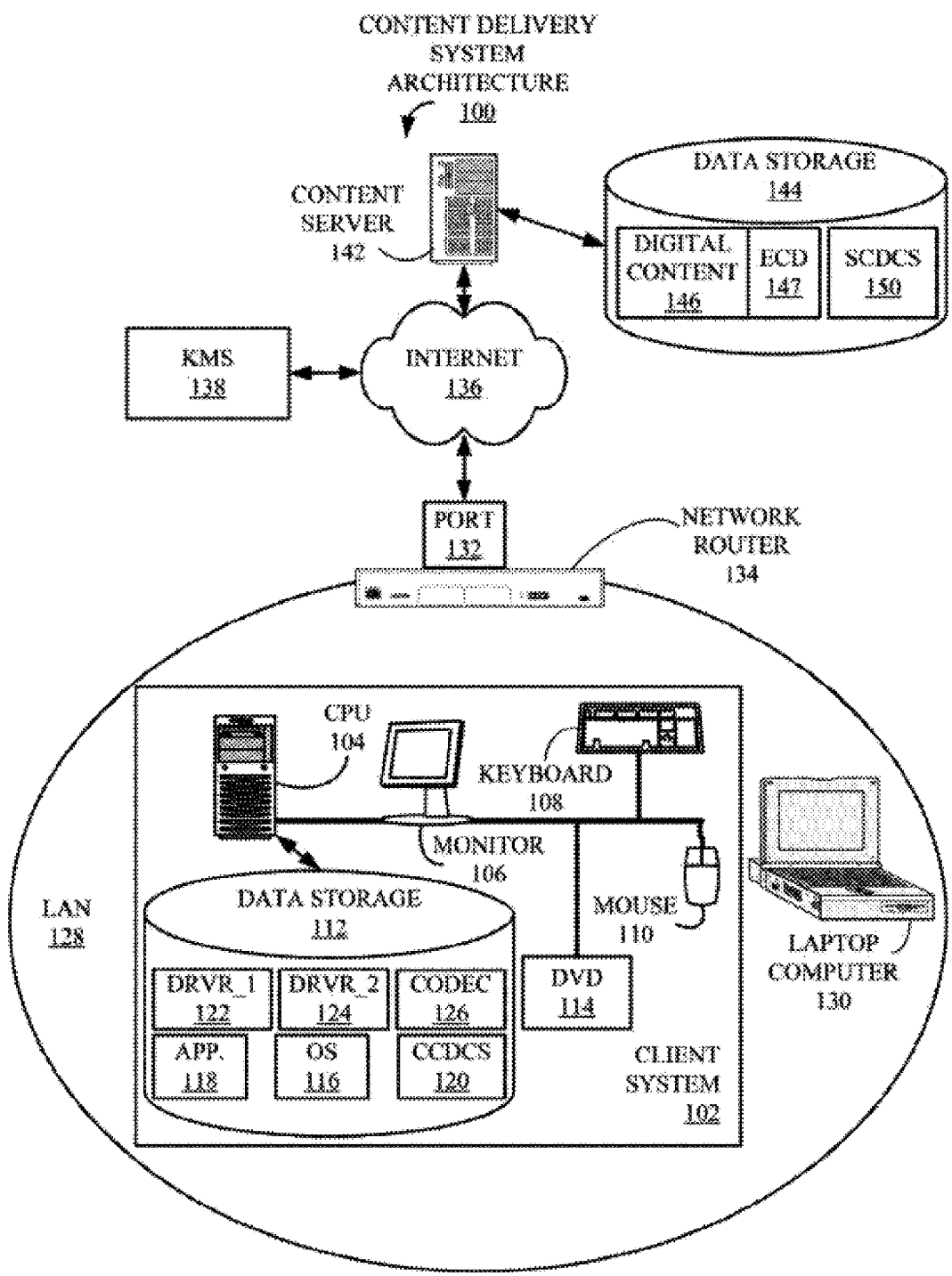
FIG. 1 is a block diagram of one example of a content delivery system architecture that may employ the claimed subject matter.

Turning now to the figures, FIG. 1 is a block diagram of one example of a content delivery System architecture 100 that employs the claimed subject matter. Content delivery system 100 includes a client system 102, which includes a central processing unit (CPU) 104, coupled to a monitor 106, a keyboard 108 and a mouse 110, which together facilitate human interaction with computer 102. Also included in computer 102 and attached to CPU 104 is a data storage component 112. Data storage component 112 which may either be incorporated into CPU 104 i.e. an internal device, or attached externally to CPU 104 by means of various, commonly available connection devices such as but not limited to, a universal serial bus (USB) port (not shown). System 100 also includes a digital versatile disk (DVD) player 114, which enables a user to display appropriately formatted digital content on monitor 106 or a television (not shown).

Data storage 112 is illustrated storing an OS 116 that controls the operation of client system 102, application 118 and two (2) device drivers, a DRVR_1 122 and a DRVR_2 124 and a codec 126. Also stored on data storage 116 is a Client Content Delivery Control System (CCDCS) 120. CCDCS 120 implements the claimed technology on client system 102 and, although illustrated as a stand-alone component, could, in an alternative embodiment, be incorporated into OS 116. In this example, CCDCS 120 executes on CPU 104. CCDCS 120 is described in more detail below in conjunction with FIGS. 3-6.

Client system 102 is just one example of a device that may take advantage of the claimed subject matter. Other devices include, but are not limited to appropriately configured televisions, music play back system, digital video recorders (DVRs), game devices, set-top boxes and converters. The disclosed technology is designed to control an entire content delivery, chain, regardless of the type of content or components, from the encryption to the playback of the content on a suitable device for the specific media.

Client system 102 is illustrated coupled to a local area network (LAN) 128 that also includes a laptop computer 130.

LAN 128 is communicatively coupled to a network router 134, which is connected to the Internet 136 via a network port 132. Also coupled to Internet 136 is a Key management System (KMS) 138 and a content server 142. KMS 138 authenticates digital signatures associated with various components of system 100 (see 162, 165, 167 and 169, FIG. 2). Those with skill in the computing arts should be familiar with various techniques for authenticating content including, but not limited to, PKI or broadcast encryption systems. Although not shown for the sake of simplicity, server 142 also includes components like components 104, 106, 108 and 110 of client system 102. Server 142 is also coupled to a data storage 144 that is illustrated storing digital content 146 and a Server Content Delivery Control System (SCDCS) 150. SCDCS 150 is described in more detail below in conjunction with FIGS. 2 and 4-7.

Digital content 146 is illustrated in conjunction with an Execution Chain. Descriptor (ECD) 147. ECD 147 may be embedded in digital content 146, stored and transmitted in conjunction with digital content 146 or supplied by a third-party, associated with and transmitted in conjunction with digital content 146. The generation and use of ECD 147 is described in more detail below in conjunction with FIGS. 2-6.

Those with skill in the computing and/or communication arts should appreciate that FIG. 1 is a simplified illustration of a networked content delivery system. Architecture 100 and the various components are used for illustrative purposes only and that there are many possible configurations and devices relevant to the disclosed technology. In addition, those with skill in the art would understand that standalone consumer electronic (CE) devices, such as, but not limited to, a digital video recorders (DVD), a set-top box (STB) and a digital television (DTV), are also internally comprised of a plurality of components, each controlled by the disclosed technology.

Figure 2:
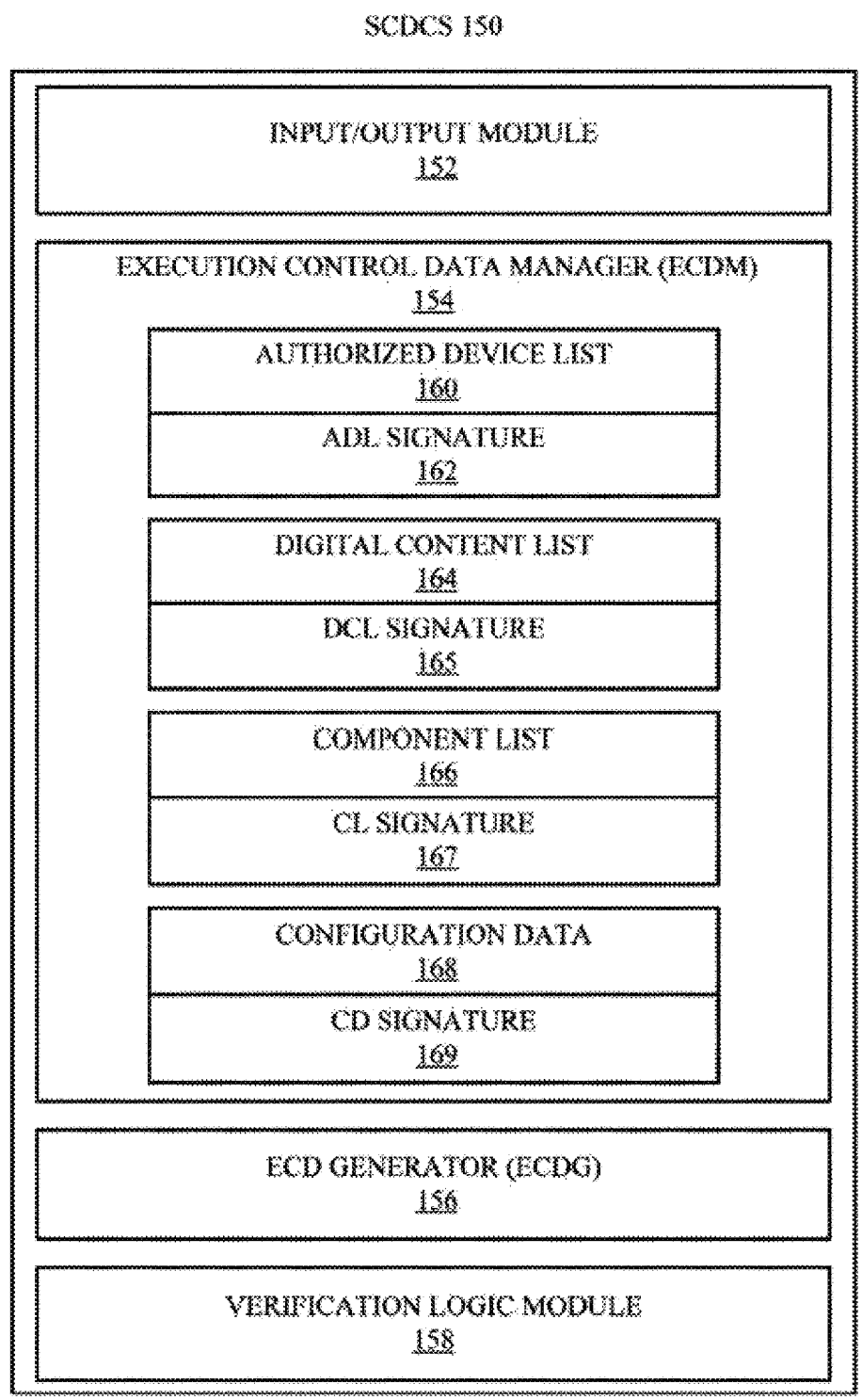
FIG. 2 is a block diagram of a Server Content Delivery Control System (SCDCS) that may implement one aspect of the claimed subject matter.

FIG. 2 is a block diagram of SCDCS 150, introduced above in FIG. 1, in greater detail. SCDCS 150 includes an input/output (I/O) module 152, an Execution Control Data Manager (ECDM) 154, an Execution Chain Descriptor Generator (ECDG) generator module 156 and a verification logic module 158. For the sake of the following examples, SCDCS 150 is assumed to execute on server 142 (FIG. 1) and stored in data storage 144 (FIG. 1). It should be understood that the claimed subject matter can be implemented in many types of computing systems and data storage structures but, for the sake of simplicity, is described only in terms of server 142 and architecture 100 (FIG. 1). Further, the representation of SCDCS 150 in FIG. 2 is a logical model. In other words, components 152, 154, 156 and 158 may be stored in the same or separates files and loaded and/or executed within system 100 either as a single system or as separate processes interacting via any available inter process communication (IPC) techniques.

I/O module 152 handles communication SCDCS 150 has with other components of system 100. ECDM 154 includes and manages a data repository for information, including lists of packaged systems (models), QoE and trusted components, and their various settings that can be embedded within or transmitted in conjunction with specific digital content controlled by SCDS 150 such as, but not limited to, digital content 146 (FIG. 1) and approved components, settings and systems for the playback of content 146. Examples of the types of information stored in ECDM 154 include an authorized device list (ADL) 160, a digital content list (DCL) 164, a component list 166 and configuration data 168. Information from ECDM 154 actually employed in conjunction with digital content 146 is stored in ECD 147 (FIG. 1). In other words, ECDM 154 stores and manages complete sets of data 160, 164, 166 and 168 that are employed to generate one or more ECDs such as ECD 147. Each ECD includes sets of information, appropriate for the corresponding digital content 146, individually or collectively signed for authentication purposes, from data sets 160, 164, 166 and 168.

ADL 160 is employed to determine whether or not a particular device, such as DVD player 114 (FIG. 1), and/or device drivers, such as DRVR_1 122 (FIG. 1) and DRVR_2 124 (FIG. 1), are secure, i.e. unmodified and authorized to support the disclosed technology. One embodiment of ADL 160 simply includes a table with two columns, a first column with a system, device or model ID and a second column with a corresponding authorized system/model/device hash code. This particular example of a paired list is signed by an external authority with an ADL signature 162 to ensure that the stored data has not been altered. ADL signature 162 enables ADL 160 to be stored either locally or remotely without the fear of tampering. The hash associated with each individual system, device or model is computed using an agreed upon hashing algorithm such as SHA1 with specified initializers and parameters. In addition, the list or individual entries may be signed to further ensure validity and integrity of ADL 160 content. Signature 162 is assigned in conjunction with KMS 138 (FIG. 1) or a service provided by KMS 138 to ensure that information stored in component 160 is accurate and has not been hacked or altered by an unauthorized party. It should be noted that unlike authorized device lists common to the cable industry, ADL 160 does not necessarily specify particular devices based upon device identifiers or electronic serial numbers (ESNs). Rather, devices may be specified by criteria such as, but not limited to, a particular manufacturer, model number or specified performance parameters.

DCL 164 stores information as to which ADL 160, CL 166 and CD 168 information applies to specific types of digital content 164 (FIG. 1), such as linear (streamed) digital movie content. DCL 164 information may include such data as whether or not particular portions of an overall digital content package are subject to the controls of the disclosed technology and, if so, one of several different levels of control. For example, some content in the public domain may be assigned few QoE stipulations in DCL 164; content menus or advertisements may indicate no restrictions; equipment manuals, corresponding equipment and commercial game, musical and movie content may be restricted throughout the entire playback chain.

Component list 166 includes information that enables SCDCS 150 to correlate devices catalogued in ADL 160 with the media catalogued in DCL 164. In other words, each particular content 146 referenced in DCL 164 is associated with a list of acceptable components referenced in ADL 160. In this manner, SCDCS 150 has access to the information necessary to control the distribution of content 146. In addition, each particular content 146 may be associated with multiple ADLs. For example, one ADL may be associated with one client or section of content and another ADL may be associated with a different client or section of content.

Configuration data 168 stores information associated with the operation of SCDCS 150. For example, configuration data 168 stores parameters that include but are not limited to control levels of available service, display and warning messages, authorized users and administrators and so on. Data 168 also includes information related to the configuration of devices listed in ADL 160. For example, configuration data associated with an Xbox 360 may specify firmware revision 1.3 and a hard drive capacity of 120 Gb; hard drive in the component chain may be required to have a minimum capacity of a 7200 RPM speed; a DVD ROM may require a 20× speed; or a video display must have a resolution of 1920×

1080, a 30,000 contrast ratio and a 120 Hz refresh rate. Another example is a configuration requirement that a device drive must be running in a specific mode, such as an I/O driver running at a specified speed with a particular packet format. One with skill in the art should appreciate that there are many possible devices, parameters and configurations associated with guaranteeing a particular quality level for the rendering of digital content that could be employed in the claimed subject matter.

Each of components 160, 164, 166 and 168 has a corresponding signature, i.e. an ADL signature 162, a DCL signature 165, a CL signature 167 and a CD signature 169, respectively. Signatures 162, 165, 167 and 169 are assigned in conjunction with KMS 138 (FIG. 1) or a service provided by KMS 138 to ensure that information stores in components 160, 164, 166 and 168 is accurate and has not been hacked or altered by an unauthorized party. These signatures 162, 165, 167 and 169 are ties to the corresponding components 160, 164, 166 and 168, respectively, such that one signature cannot be applied to a different piece of content. In the alternative, one signature (not shown) may be generated and correlated with all the components 160, 164, 166 and 168 rather than a single signature from each component. As explained above, ECD 147 also includes one or more signatures corresponding to ECD 147 itself or components of ECD 147.

ECDG 156 correlates a proposed transmission path with a particular media and available components along the proposed path to generate an ordered list of actual devices or sets of possible devices, an optional known identifier indicating the purpose of the content or execution chain and an optional update locator (URL) for retrieving updated information concerning media and components. ECDG 156 generates ECDs such as ECD 147. ECDs may be either generated as needed or generated and stored for future use. VLM 158 employs the ECD 147 generated by ECDG 156 to map a proposed payback system to the selected media. In the alternative rather than employing a pre-determined execution chain, SCDCS 150 may verify devices on a step-by-step basis throughout the execution chain. Depending upon configuration parameters stored in configuration data 168, VLM 168 transmits the media along the approved path, facilitates the prevention of the transmission because of failed criteria or transmits the media with a QoE warning. The setup and operation of data and modules 152, 154, 156, 158, 160, 162, 164, 166 and 168 are explained in more detail below in conjunction with FIGS. 4-7.

Figure 3:
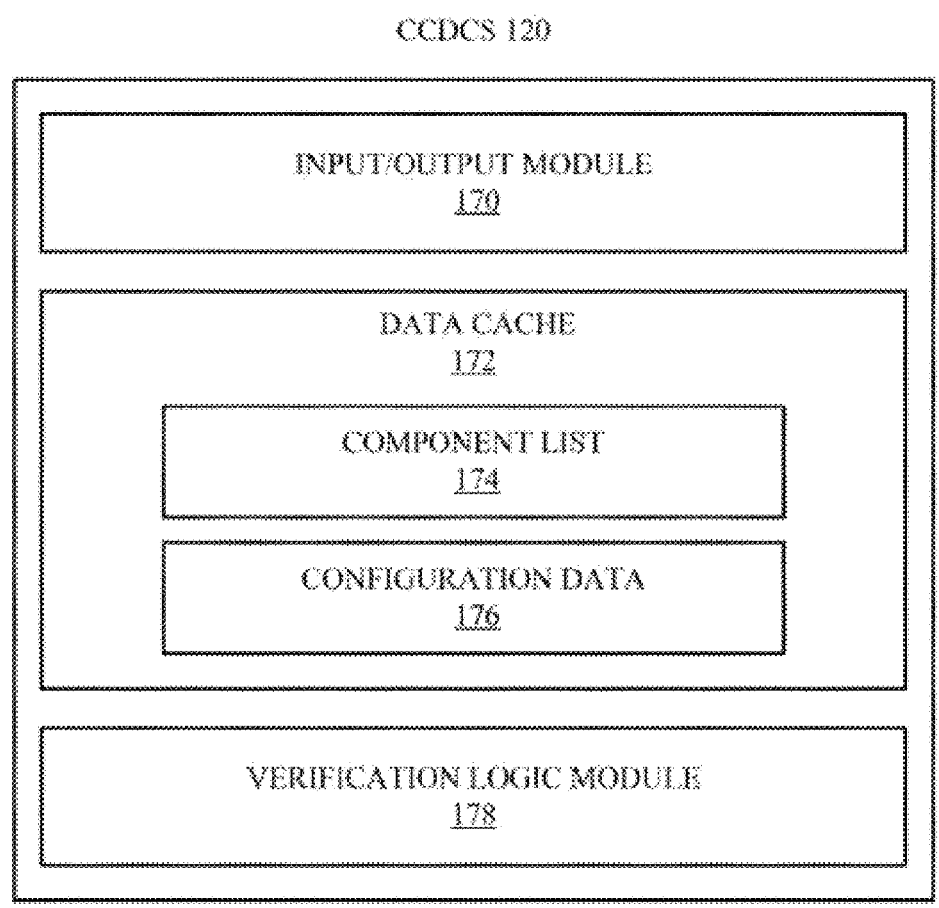
FIG. 3 is a block diagram of a Client Content Delivery Control System (SCDCS) that may implement one aspect of the claimed subject matter.

FIG. 3 is a block diagram of CCDCS 120, introduced above in FIG. 1, in greater detail. CCDCS 120 includes an input/output (I/O) module 170, a data cache component 172 and a verification logic module 178. Data cache 172 includes a component list 174 and a configuration data module 176. For the sake of the following examples, CCDCS 120 is assumed to execute on client system 102 (FIG. 1) and stored in data storage 112 (FIG. 1). Although not illustrated DC 172, CL 174 and CD 176 may also be protected by signatures generated by KMS 138 (FIG. 1) or some other means. It should be understood that the claimed subject matter can be implemented in many types of computing systems and data storage structures but, for the sake of simplicity, is described only in terms of client 102 and architecture 100 (FIG. 1). Further, the representation of CCDCS 120 in FIG. 3 is a logical model. In other words, components 170, 172, 174, 176 and 178 may be stored in the same or separates files and loaded and/or executed within system 100 either as a single system or as separate processes interacting via any available inter process communication (IPC) techniques.

I/O module 170 handles communication CCDCS 120 has with other components of system 100. Data cache 172 is a data repository for information, including settings and lists, that specify specific digital content such as digital content 146 (FIG. 1) and acceptable components and systems for the playback of content 146. Examples of the types of information stored in data cache 172 include information like that stored in component list 166 and configuration data 168 of SCDCS 150, all of which were described above in conjunction with FIG. 2.

Component list 174 stores a list of the components currently available in client system 102, including any possible components along a potential content transmission path. Configuration data 176 stores information associated with the operation of CCDCS 120. For example, configuration data 176 stores parameters that include but are not limited to control levels of available service, display and warning messages, authorized users and administrators and so on.

VLM 178 employs ECD 147 (FIG. 1) generated by ECDG 156 (FIG. 2) of SCDCS 150 (FIGS. 1 and 2) and transmitted in conjunction with content 146 to map a proposed payback system to the selected media. In the alternative rather than employing a pre-determined execution chain, devices may be verified on a step-by-step basis throughout the execution chain. Depending upon configuration parameters stored in configuration data 176, VLM 178 transmits the media along the approved path, prevents the transmission because of failed criteria or transmits the media with a QoE warning. The setup and operation of data and modules 170, 172, 174, 176 and 178 are explained in more detail below in conjunction with FIGS. 4-7.

Figure 4:
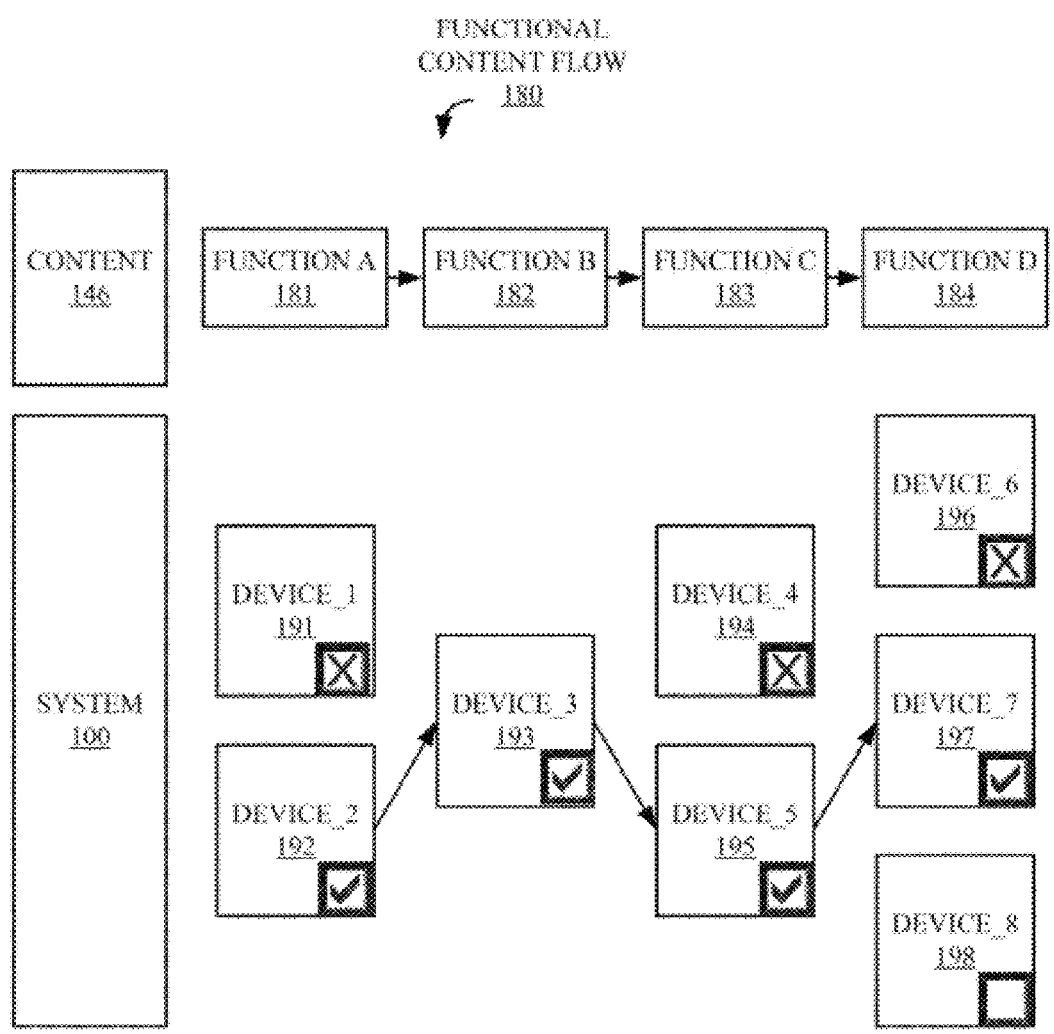
FIG. 4 is a function diagram illustrating an example of the media flow associated with SCDCS of FIGS. 1 and 2 and CCDCS of FIGS. 1 and 3 and the architecture introduced in FIG. 1.

FIG. 4 is a block diagram of a functional content flow 180 illustrating the media flow associated with CCDCS 120 (FIGS. 1 and 3) and SCDCS 150 (FIGS. 1 and 2) in conjunction with architecture 100 (FIG. 1) and digital content 146 (FIG. 1). In a digital content delivery system such as architecture 100, digital content such as content 146 is typically processed at multiple stages. In this example, content 146 is processed by a Function A 181, a Function B 182, a Function C 183 and a Function D 184. For the purposes of illustration, content is a DVD encoded movie, Function A 181 represents an encryption process (not shown). Function B represents 182 processing by a codec, Function C 183 represents processing by a DVD player 112 and Function D represents display on a monitor such as monitor or television.

Various system 100 components are available to execute each of functions 181-184. For example, server 142 (FIG. 1) may have access to several different encryption algorithms (not shown), each with specific advantages and disadvantages. In this example, device_1 191 represents a first encryption algorithm and device_2 192 represents a second. In a similar fashion, device_3 193 represents codec 126 (FIG. 1), device_4 represents DRVR_1 122 (FIG. 1), device_5 195 represents DRVR_2 124 (FIG. 1), device_6 196 represents a monitor coupled to laptop computer 130 (FIG. 1), device_7 197 represents monitor 106 (FIG. 1) and device_8 198 represents a high definition television (not shown) that is not connected to system 100. It should be understood that the disclosed methods and devices may check every component in a particular delivery chain, although for the sake of simplicity, the following examples illustrate only the validation of selected components.

Check boxes located in the lower right corner of devices 191-197 represent an evaluation of the corresponding device 191-197 for the purpose of rendering content 146. For example, the check box corresponding to device_1 191, which is marked as follows: ☒, indicates that the encryption algorithm associated with device_1 191 is not suitable for the delivery of content 146. The check box corresponding to device_2 192, which is marked as follows: ☑ , indicates that the encryption algorithm associated with device_2 192 is suitable for the delivery of content 146, i.e. has passed test associated with content control (see FIGS. 4-6). The check box corresponding to device_8 198, which is marked as follows: ☐ , indicates that the HDTV associated with device_8 198 is not detectable and therefore cannot be evaluated for the purpose of delivery of content 146.

As mentioned above in the Summary, evaluation of a particular component may factor in many issues such as, but not limited to, performance characteristics, user preferences, expected stability, power requirements and system preferences. For example, some encryption algorithms may provide a higher level of security but slow the transmission and playback of content 100. Some encryption algorithms may preserve the resolution of content 100 and some may not. The claimed subject matter enables a content administrator to specify a particular encryption algorithm based upon specific criteria associated with a particular content 146.

Figure 5:
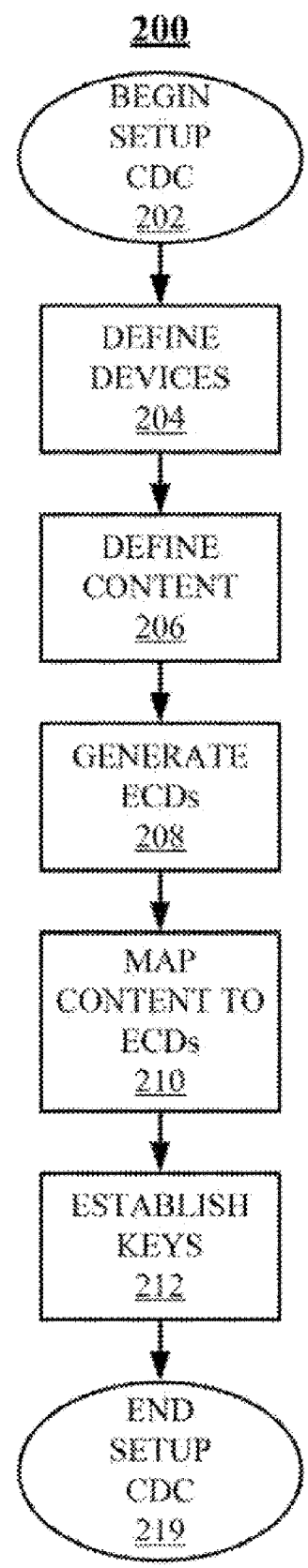
FIG. 5 is a flowchart of an example of a Setup Content Delivery Control process.

FIG. 5 is a flowchart of a Setup Content Delivery Control (CDC) process 200 employed in conjunction with the claimed subject matter. In the following example, process 200 is stored on data storage 144 (FIG. 1) and primarily executed on content server 142 (FIG. 1) as part of SCDCS 150 (FIGS. 1 and 2). It should be understood that this is only one example of storage and execution and that many different configurations are possible. For example, SCDCS 150 could be implemented on a separate dedicated server or distributed across multiple platforms, including client system 102 (FIG. 1) and incorporate functions associated with CCDCS 120 (FIG. 1).

Process 200 starts in a "Begin Setup Content Delivery Control (CDC)" block 202 and proceeds immediately to a "Define Devices" block 204. During block 204, process 200 generates a graphical user interface (not shown) that enables a user or administrator to define parameters associated with devices that are likely to be encounter during an implementation of the content deliver control of the claimed subject matter. Information related to defined devices is stored in authorized device list 160 (FIG. 2). During a "Define Content" block 206, process 200 enables the user or administrator to employ the same GUI used in conjunction with block 204 to specify and define specific digital content that is subject to content delivery control. Content information is stored in digital content list 164 (FIG. 2).

During a "Generate Execution Chain Descriptors (ECDs)" block 208, process 200 generates ECDs such as ECD 147 (FIG. 1) by calculating likely paths over which any particular content may be downloaded and presented. ECDs include an ordered list of devices defined during block 204 and an identifier that indicates the purpose of the content or execution chain. ECDs may also include an update locator (URL) for securely retrieving updated execution chain descriptor for another device or web service configured to provide this service.

During a "Map Content to ECDs" block 210, the GUI of blocks 204 and 206 enables a user or administrator to associate specific content defined during block 206 with specific devices defined during block 204 by cryptographically coupling, or binding, the content to specific ECDs created during block 208. During block 210, information is generated by ECDG 156 (FIG. 2) and stored in component list 166 (FIG. 2). For example, a movie that is stored in high definition (content) may be coupled to a high definition television (HDTV) (device) so that a particular user is either prevented from downloading the movie for display on a low definition television or, in the alternative, presented with a warning that the QoE associated with the user's particular device may not be optimum.

During an "Establish Keys" block 214, keys for the establishment of secure communication paths are distributed to components of system 100 (FIG. 1). Keys are employed so that various components of the system such as SCDCS 150 and CCDCS 120 can exchange hash codes to determine whether or not the system has been breached, i.e. to ensure the system is tamper-resistant. A hash code is generated and associated with each component of a distribution chain may be included in a content stream or as a reference to the stream, possible via a techniques such as trusted platform module (TPM) (not shown). Further, an authorized device table that includes device IDs and corresponding authorized hast codes is one example of a suitable implementation. This table could also be signed by an external authority to ensure that the table has not been tampered with. Finally, control proceeds to an "End Setup Content Delivery Control (CDC)" block 219 in which process 200 is complete. Information generated during block 214 is stored in VLM 158 (FIG. 2).

Figure 6:
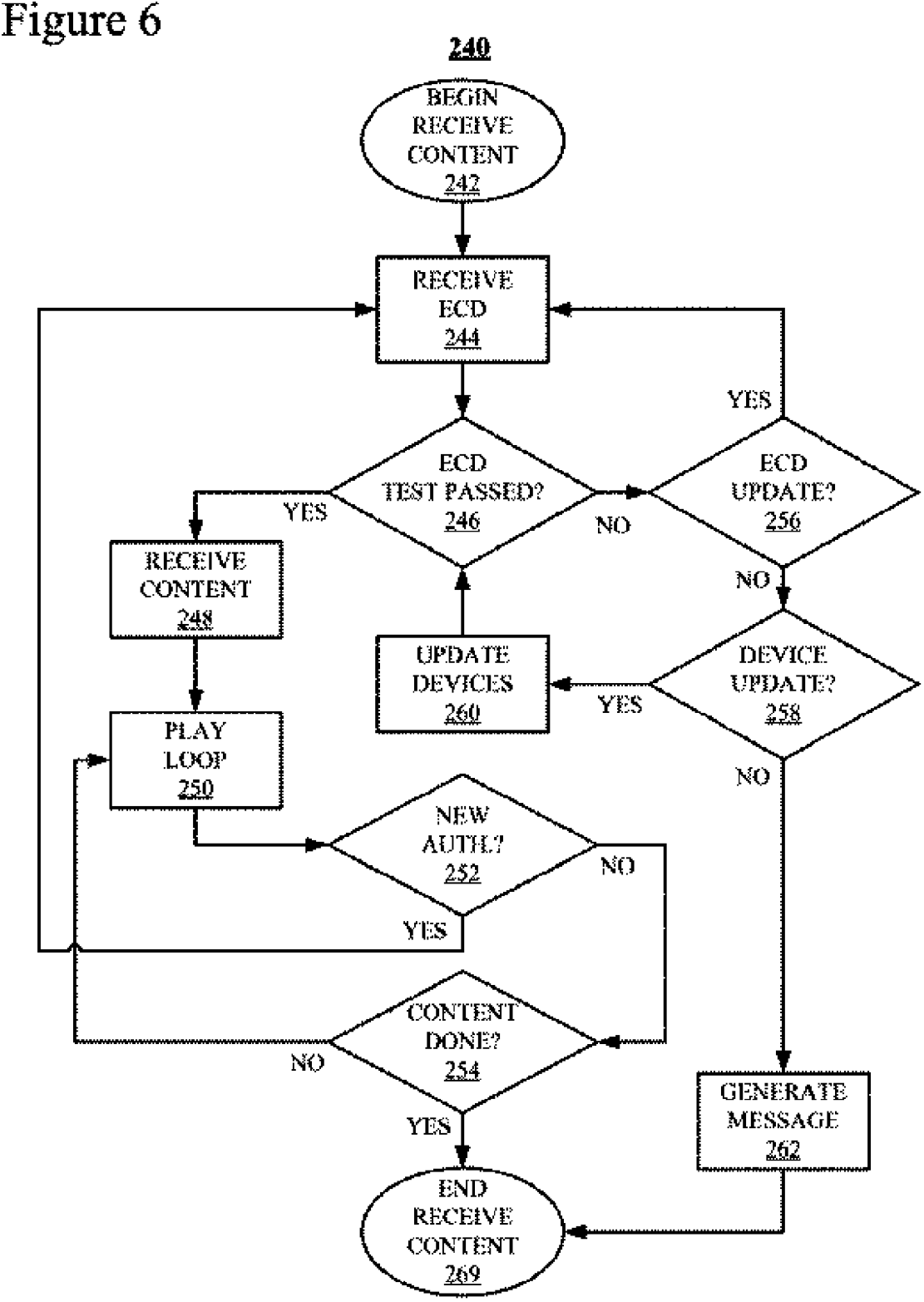
FIG. 6 is a flowchart of an example of a Receive Content process implemented by the claimed subject matter.

FIG. 6 is a flowchart of a Receive Content process 240 employed in conjunction with the claimed subject matter. In the example, process 240 is stored on data storage 112 (FIG. 1) and executed on client system 102 (FIG. 1) as part of CCDCS 120 (FIGS. 1 and 3) and is described in conjunction with the delivery of content 146 (FIG. 1). It should be understood that this is only one example and that many different configurations are possible. For example, CCDCS 120 could be implemented on a separate server controlling the delivery of digital content to client devices, on a set-top or game device, or distributed across multiple platforms, including server 142 (FIG. 1).

Process 240 starts in a "Begin Receive Content" block 242 and proceeds immediately to a "Receive ECD" block 244. During block 244, process 240 receives ECD 147 (FIG. 1), which may be included in a header associated with content 146 or included with the first blocks of data associated with content 146. As explained above in conjunction with FIG. 2, ECD 147 is generated by ECDG 156 (FIG. 2) of SCDCS 150. During an "ECD Test Passed?" block 246, process 240 determines whether or not the various devices involved in the delivery of content 146 from server 142 to client system 102 are appropriate for the delivery of content 146. This determination is based upon based information in ECD 147, which was received during block 244 and is typically included in content 146, information extracted from an analysis of the path from server 142 to client system 102 traversed by content 146 and from information relating to the configuration of client system 102.

If process 240 determines that all devices included in the transmission and rendering of content 146 are authorized devices, control proceeds to a "Receive Content" block 248 during which the transmission by server 142 and the receiving by system 102 of content 146 proceeds. During a "Play Loop" block 250, content 146 is rendered, or played. Periodically during play back of content 146, process 240 proceeds from block 250 to a "New Authorization?" block 252 during which process 240 rechecks the ECD 147 transmitted in conjunction with content 146 to determine whether or not the current ECD 147 has been updated or modified. In this manner, unlike current content protection systems, requirements for any particular content 146 may change during playback. For example, one section of content 146 may require a higher quality or different, type of sound system than another section and the disclosed technology enables the payback system to detect this event and possibly adapt. If no new authorization is indicated, process 240 proceeds to a "Content Done?" block 254 during which process 240 determines whether or not content 146 has been completed. If not, process 240 returns to Play Loop block 250 and processing continues as described above. If, during block 252, a new authorization is indicated, process 240 returns to Receive ECD block 244 during which a new or updated EDC 147 is received and processing continues as described above.

If, during block 246, process 240 determines that the devices in the transmission or playback loop are not authorized, control proceeds to an "ECD Update?" block 256. During block 256, process 240 determines whether or not that is a more current version of ECD 147. If so, process 240 returns to block 244 during which an updated ECD 147 is retrieved and processing continues as described above. If, during block 256, process 240 determines that there is no updated version of ECD 147, control proceeds to a "Device Update?" block 258. During block 258, process 240 determines whether or not there are additional or substitute devices and/or drivers to take the place of the devices that failed the test during block 246. If so, process 240 proceeds to an "Update Devices" block 260 during which process 240 loads or registers the new devices and/or drivers. Control then returns to Devices Authorized? Block 246 and processing continues as described above.

If during block 258, process 240 determines that there are no additional or substitute devices, control proceeds to a "Generate Message" block 262 during which process 240 generates and transmits an appropriate message to the user who requested content 146 indicating that the current configuration is unable to process content 146. In the alternative, the message may indicate that the content provider cannot guarantee the QoE related to content 146 but that content 146 will be presented anyway. Finally, once content 146 has been completed during block 254 or an error message has been transmitted to the user during block 262, control proceeds to an "End Receive Content" block 269 in which process 240 is complete.

While the claimed subject matter has been shown and described with reference to particular embodiments thereof, it will be understood by those skilled in the art that the foregoing and other changes in form and detail may be made therein without departing from the spirit and scope of the claimed subject matter, including but not limited to additional, less or modified elements and/or additional, less or modified blocks performed in the same or a different order.

We claim:

1. A method for the transmission and rendering of digital content, comprising:
   generating an execution chain descriptor (ECD) corresponding to a digital content, wherein the ECD specifies requirements for a suitable configuration for a transmission and rendering of the digital content;
   cryptographically binding the ECD to the corresponding digital content; evaluating, with respect to the ECD, a potential path for the transmission and rendering of the digital content to produce a path evaluation;
   transmitting and rendering the digital content via the potential path if the path evaluation indicates that the potential path meets the requirements specified in the ECD;
   transmitting a message to a requester of the digital content if the path evaluation indicates that the potential path does not meet the requirements specified in the ECD; and receiving a second ECD cryptographically bound to the digital content once the transmission and rendering has been initiated;
   evaluating the potential path for the transmission and rendering of the digital content with respect to the second ECD to produce a second path evaluation; and
   continuing to transmit and render the digital content via the potential path if the second path evaluation indicates that the potential path meets the requirements specified in the second ECD; and
   discontinuing to transmit and render the digital content via the potential path if the second path evaluation indicates that the potential path does not meet the requirements specified in the second ECD.

2. The method of claim 1, further comprising: signing the ECD with a digital signature; and authenticating, as a condition of the evaluation, the digital signature to ensure that the ECD has not been altered.

3. The method of claim 1, wherein the ECD specifies criteria associated with performance parameters corresponding to each component employed to transmit or render the digital content.

4. The method of claim 1, wherein the ECD identities particular models of components suitable for the transmission or rendering of the digital content.

5. The method of claim 1, wherein the ECD corresponds to and is cryptographically bound to more than one digital content.

6. The method of claim 1, further comprising; generating a second ECD corresponding to the digital content, wherein the second ECD specifies requirements for a suitable configuration for a transmission and playback of the digital content to a client that is different than a client associated with the first ECD; and cryptographically binding the second ECD to the corresponding digital content.

7. A system for the transmission and rendering of digital content, comprising:
   a processor;
   a memory coupled to the processor;
   an execution chain descriptor (ECD) corresponding to a digital content, wherein the ECD specifies requirements for a suitable configuration for a transmission and rendering of the digital content; and logic, stored on the memory and executed on the processor; for:
   cryptographically binding the ECD to the corresponding digital content;
   evaluating, with respect to the ECD, a potential path for the transmission and rendering of the digital content to produce a path evaluation;
   transmitting and rendering the digital content via the potential path if the path evaluation indicates that the potential path meets the requirements specified in the ECD;
   transmitting a message to a requester of the digital content if the path evaluation indicates that the potential path does not meet the requirements specified in the ECD;
   and receiving a second ECD cryptographically bound to the digital content once the transmission and rendering has been initiated;
   evaluating the potential path for the transmission and rendering of the digital content with respect to the second ECD to produce a second path evaluation; and
   continuing to transmit and render the digital content via the potential path if the second path evaluation indicates that the potential path meets the requirements specified in the second ECD; and
   discontinuing to transmit and render the digital content via the potential path if the second path evaluation indicates that the potential path does not meet the requirements specified in the second ECD.

8. The system of claim 7, the logic further comprising logic, stored on the memory and executed on the processor, for: signing the ECD with a digital signature; and authenticating, as a condition of the evaluation, the digital signature to ensure that the ECD has not been altered.

9. The system of claim 7, wherein the ECD specifies criteria associated with performance parameters corresponding to each component employed to transmit or render the digital content.

10. The system of claim 7, wherein the ECD identifies particular models of components suitable for the transmission or rendering of the digital content.

11. The system of claim 7, wherein the ECD corresponds to and is cryptographically bound to more than one digital content.

12. The system of claim 7, the logic further comprising logic, stored on the memory and executed on the processor, for: generating a second ECD corresponding to the digital content, wherein the second ECD specifies requirements for a suitable configuration for a transmission and rendering of the digital content to a client that is different than a client associated with the first ECD; and cryptographically binding the second ECD to the corresponding digital content.

13. A computer programming product for the transmission and rendering of digital content, comprising:
   a memory;
   logic, stored on the memory for execution on a processor, for:
      generating an execution chain descriptor (ECD) corresponding to a digital content, wherein the ECD specifies requirements for a suitable configuration for a transmission and rendering of the digital content;
      cryptographically binding the ECD to the corresponding digital content;
      evaluating, with respect to the ECD, a potential path for the transmission and rendering of the digital content to produce a path evaluation;
      transmitting and rendering the digital content via the potential path if the path evaluation indicates that the potential path meets the requirements specified in the ECD;
      transmitting a message to a requester of the digital content if the path evaluation indicates that the potential path does not meet the requirements specified in the ECD;
      and receiving a second ECD cryptographically bound to the digital content once the transmission and rendering has been initiated;
      evaluating the potential path for the transmission and rendering of the digital content with respect to the second ECD to produce a second path evaluation; and
      continuing to transmit and render the digital content via the potential path if the second path evaluation indicates that the potential path meets the requirements specified in the second ECD; and
      discontinuing to transmit and render the digital content via the potential path if the second path evaluation indicates that the potential path does not meet the requirements specified in the second ECD.

14. The computer programming product of claim 13, the logic further comprising logic, stored on the memory for execution the processor, for: signing the ECD with a digital signature; and authenticating, as a condition of the evaluation, the digital signature to ensure that the ECD has not been altered.

15. The computer programming product of claim 13, wherein the ECD specifies criteria associated with performance parameters corresponding to each component employed to transmit or render the digital content.

16. The computer programming product of claim 13, wherein the ECD identifies particular models of components suitable for the transmission or rendering of the digital content.

17. The computer programming product of claim 13, wherein the ECD corresponds to and is cryptographically bound to more than one digital content.

* * * * *